W. WILLOUGHBY.
Car Wheel.
No. 20,610. Patented June 15, 1858.
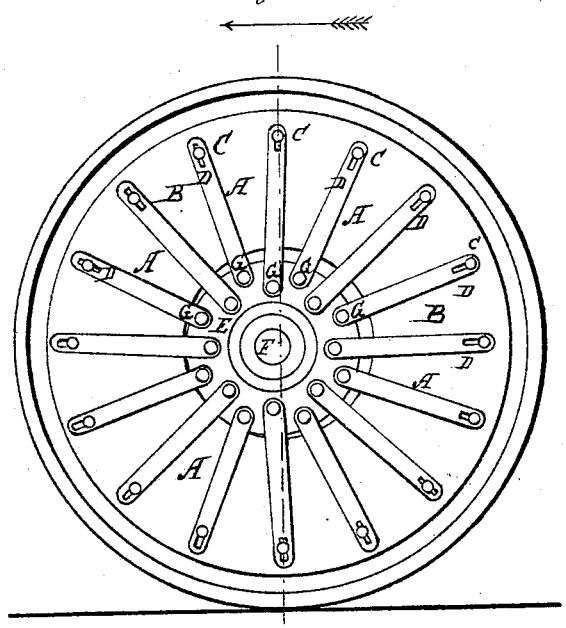
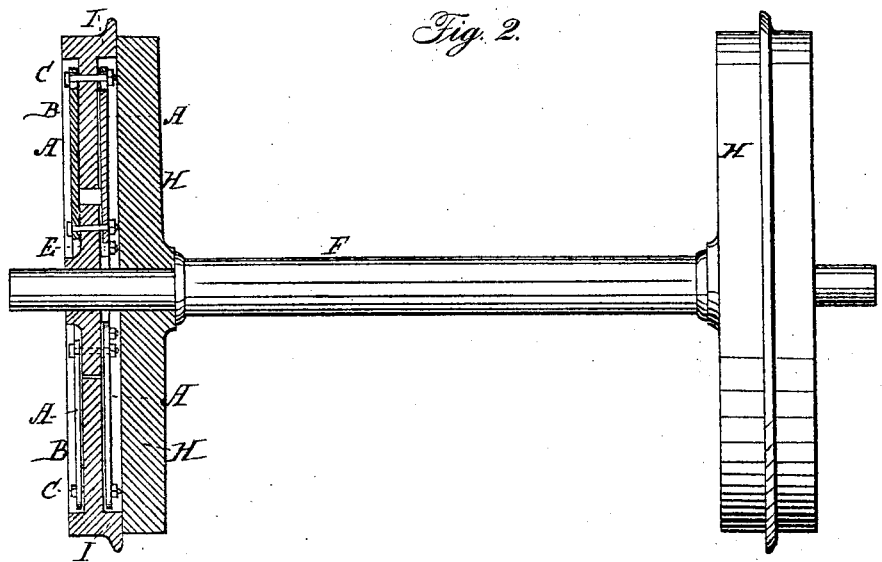

UNITED STATES PATENT OFFICE.

W. WILLOUGHBY, OF MARKWELL, MISSISSIPPI, ASSIGNOR TO HIMSELF AND W. H. WIZEMAN, OF SAME PLACE.

CAR-WHEEL, &c.

Specification of Letters Patent No. 20,610, dated June 15, 1858.

*To all whom it may concern:*

Be it known that I, WEBSTER WILLOUGHBY, of Markwell, in the county of Lauderdale and State of Mississippi, have invented a new and useful Improvement in Railroad-Car and other Wheels; and I do hereby declare that the following is a full, clear, and exact description of the same, reference being had to the annexed drawings of the same, making part of this specification.

Figure 1, is a side elevation of a railroad car wheel constructed after the improved plan. Fig. 2, is a vertical section of ditto, and a front elevation of the wheel on the opposite end of the axle.

Similar letters in the figures refer to corresponding parts.

The nature of this invention consists in suspending and supporting the axles on which the weight of railroad cars and other vehicles rest, by means of slotted bars, attached to the main body or tread portion of the wheels, and securing an additional wheel to the axle for steadying the same laterally, in such a manner as to enable the axles to oscillate to either side of the center of said tread portions, and to be slightly in advance of, and eccentric with the same, during the forward progress of the car, or other vehicle supported by the same.

To enable others skilled in the art to make and use my invention I will proceed to describe its construction and operation.

The slotted bars A, are arranged on either side of the disk B, of the tread of the wheel and attached to the same at their outer extremities by means of bolts C, passing through slots D, formed in the ends of the bars and through openings formed in the disk B, near the tread on a circle scribed from the center of the same. These slotted bars or spokes A, extend toward the center in irregular lines, every alternate bar continuing farther than the intervening one, and all being attached at their inner ends to a hub E, firmly secured to the axle F, by means of bolts G, passing through openings in the inner ends of the bars A, and through the hub E. The slotted bars on the inner side of the disk are arranged immediately opposite those on the outer side, and being of the same respective length, and attached at their ends to the same bolts, are caused to assume corresponding relations to each other throughout the revolution of the wheel. The flanged portion of the wheel is prevented from having any lateral motion by an additional disk or wheel H, of the same diameter as the tread portion of the wheel B, secured firmly to the axle F, immediately inside the said wheel B, in such a manner as to receive on its outer face next the periphery the bearing of the projecting portion I, on which the flanch is formed, a sufficient space being left between the outer face of the additional disk or wheel H, and the face of the disk B, and hub E, to enable the inner slotted bars A, to work freely.

The hub E, is oscillated within the circular space formed in the center of the disk B, to either side of the center of the tread portion of the wheel, to correspond with the direction in which the car or other vehicle is moving, so as to bring the center of the axle a short distance in advance of and eccentric with it, as represented in Fig. 1. This transfer of the center of gravitation causes the whole weight of the car or other vehicle to be suspended on the bars or spokes, immediately in advance of a vertical line running through the center of the tread portion of the wheel, at all times, the eccentric movement of the bolts C, near the periphery of the disk B, in relation to the bolts G, to which the inner ends of the bars A, are attached, causing said bars to constantly alter their tangential and radial positions as they revolve, and bring the inner and outer ends of their slots in the proper relation to the bolts C, to bring about this result.

What I claim as new and desire to secure by Letters Patent, is,

The combination of the slotted bars or spokes A, and oscillating hub E, and disk B, for suspending the axle of the wheel in advance of the center of the tread portion of the wheel, with the additional disk or wheel H, for keeping the tread portion of the wheel and disk B, in a vertical position during its revolution as described.

WEBSTER WILLOUGHBY.

Witnesses:
 Mc. H. WHITAKER,
 R. K. CURTIS.